United States Patent
VanDeMortel (12)

(10) Patent No.: US 6,953,201 B1
(45) Date of Patent: Oct. 11, 2005

(54) CYCLE HANDLEBAR SHOCK AND VIBRATION DAMPER

(76) Inventor: Dennis R. VanDeMortel, 17700 Sunwest Cir., Yorba Linda, CA (US) 92866

( * ) Notice: Subject to any disclaimer, the term of this patent is extended or adjusted under 35 U.S.C. 154(b) by 43 days.

(21) Appl. No.: 10/437,466

(22) Filed: May 14, 2003

(51) Int. Cl.[7] .............................................. B62K 21/20
(52) U.S. Cl. ...................... 280/276; 74/551.2; 280/279
(58) Field of Search ............................... 280/279, 280, 280/283, 275, 276; 74/551.2, 551.1, 551.3, 74/551.4

(56) References Cited

U.S. PATENT DOCUMENTS

| | | | |
|---|---|---|---|
| 6,035,741 A * | 3/2000 | Krizman, Jr. ............... | 74/551.8 |
| 6,332,625 B1 * | 12/2001 | Fukunaga et al. .......... | 280/280 |
| 6,712,541 B1 * | 3/2004 | Henricksen ................. | 403/344 |

FOREIGN PATENT DOCUMENTS

| | | | |
|---|---|---|---|
| JP | 2-169382 | * | 12/1988 |
| JP | 2-169382 | * | 6/1990 |

* cited by examiner

*Primary Examiner*—Anne Marie Boehler
(74) *Attorney, Agent, or Firm*—Albert O. Cota (57) ABSTRACT

A handlebar shock and vibration damper triple clamp (20) for a motorcycle or a bicycle is taught which comprises a handlebar triple clamp body (22) with a pair of clamps that holds the handlebar in isolation from the body. The body has a pair of integral front fork mounting rings (24) positioned on opposite ends, and a pair of upright cradles (26) adjacent to the rings. A lower handlebar clamp (44) is positioned within each cradle such that the clamp is completely segregated from the triple clamp body. Resilient isolation strips (50) and cylinders (52) engage the upright cradles and lower handlebar clamps, thereby providing a pliant interface therebetween. An upper handlebar bridge clamp (60) is disposed above each lower handlebar clamp such that a handlebar may be inserted and compressably retained therebetween, thus decreasing vibration and shock impulses upon the handlebar during operation of the cycle due to the elastic nature of the interface.

13 Claims, 6 Drawing Sheets

CYCLE HANDLEBAR SHOCK AND VIBRATION DAMPER

TECHNICAL FIELD

The invention generally relates to handlebar clamping brackets for two-wheeled cycles and more specifically, to a handlebar clamping bracket for a motorcycle or bicycle that provides shock and vibration dampening.

BACKGROUND ART

Previously, many types of handlebar mounting brackets have been used to provide an effective means of holding the handlebar on a motorcycle or bicycle. In most cases the handlebar is clamped between two elements which allows angular positioning and ease of removal for replacement. While prior art has developed a myriad of dampening devices for the front forks of motorcycles and bicycles, little has been done to isolate the handlebars for shock and vibration.

The prior art listed below did not disclose any patents that possess the novelty of the instant invention, however the following U.S. patents are considered related:

| U.S. Pat. No. | Inventor | Issue Date |
| --- | --- | --- |
| 3,989,261 | Kawaguchi | Nov. 2, 1976 |
| 4,515,384 | Honma, et al. | May 7, 1985 |
| 4,807,860 | Simmons | Feb. 28, 1989 |
| 5,301,973 | Truchiniski | Apr. 12, 1994 |
| 5,417,446 | Pileggi | May 23, 1995 |
| 5,540,457 | Johnson | Jul. 30, 1996 |
| 5,927,740 | Hopey | Jul. 27, 1999 |
| 6,471,229 | Stewart | Oct. 29, 2002 |

Kawaguchi in U.S. Pat. No. 3,989,261 teaches that torque exerted upon braking locks a pair of shock absorbers against compression caused by inertia. In another embodiment, the angular displacement of the shock absorber under inertia results in the closure of a shutoff valve disposed between hydraulic fluid chambers within one of the shock absorbers.

U.S. Pat. No. 4,515,384 issued to Honma, et al. is for a motorcycle front-wheel suspension system utilizing hydraulic shock absorbers that provide anti-dive braking. Bypass oil passage is provided between inner and outer tubular members with an adjustable orifice achieving an intermediate position, thus eliminating contraction of the front fork in an anti-dive operation.

Simmons in U.S. Pat. No. 4,807,860 discloses a motorcycle front fork having a hollow damper rod which has a piston at the upper end that engages the interior surface of a fork tube. A float tube is provided having a fluid regulation valve and a compression port that allows communication therebetween such that the valve closes or opens between two springs, thereby permitting a slide to move in opposite directions.

Truchiniski in U.S. Pat. No. 5,301,973 teaches a device that allows pre-compression of a main suspension spring to be externally adjusted from the outside, thus eliminating the need to disassemble the suspension column for adjustment.

U.S. Pat. No. 5,417,446 issued to Pileggi describes a shock absorbing fork for a bicycle that is dampened when an obstacle is encountered. The struts of the fork have an inner cylinder mounted within an outer cylinder. Pads are utilized in the inner cylinder to create compressed air that responds to impact force. The reduction in stored impact energy in turn reduces the cyclical rebound to the fork, which enables it to reach equilibrium quickly.

Johnson in U.S. Pat. No. 5,540,457 discloses a bicycle steering assembly with a stem assembly that is fastened to the upper end of a steerer tube with an expansion bolt.

U.S. Pat. No. 5,927,740 of Hopey is for a steering damper that is integrated into a bicycle that has a housing containing a damping medium. A dam is included in the housing with a single vane connected to a shaft which passes through the housing. An opening in the shaft communicates with the vane to circulate the damping medium during damping. The opening in the shaft permits unrestricted flow of the damping medium during dampening. Rotation of the dam on departure of the bicycle from its directed path pressurizes the damping medium, thus producing the damping effect and subsequent return of the bicycle to its intended path.

Stewart's U.S. Pat. No. 6,471,229 discloses an adapter that is coupled to the front wheel of a bicycle and uses an actuate rod running through a dampening cartridge which stabilizes the bicycle's handlebars. The dampening cartridge is coupled to a connector via a universal joint. Adjustment is provided by a nut on one end of the cartridge, which creates the dampening effect upon the actuate rod to stabilize the handlebars when vibrating.

DISCLOSURE OF THE INVENTION

Specialized high-performance motorcycles such as dirt bikes, motocross bikes, racing bikes, and bicycles including street bikes, dual-purpose bikes, mountain bikes, and the like, utilize the same basic type of mounting brackets for holding shock absorbing forks and handlebars. The typical mounting bracket or clamp is designated as a triple clamp, as it attaches two shock absorbers that form the fork, and the handlebar itself. A conventional triple clamp (hereinafter "clamp") is rectangular in shape and has openings on each end for the shock-absorbing forks. The clamp usually has a pair of U-shaped brackets that hold the handlebar onto the clamp by compression. The difficulty with this conventional design is the fact that the handlebar is rigidly attached to the clamp, therefore all of the shock and vibration present in the frame structure is transferred directly onto the rider's arms.

Therefore, the primary object of the invention is to decrease the shock and vibration that is transferred through the handlebars to a rider on a motorcycle or bicycle. The reduction is accomplished by isolating the handlebars from the triple clamp, and utilizing a resilient damping material in between the two upright cradles which does not completely eliminate all transferred shock and vibration but reduces it significantly.

An important object of the invention is that the reduction in the sharp shock waves and constant pulsation helps considerably in preventing wrist injury, which is prevalent for riders of motorcycles or bicycles, especially those traveling rapidly over rugged terrain such as motocross or mountain biking.

Another object of the invention is the decrease of rider fatigue which can be a very important advantage over the conventional approach. In time, the vibration on the handlebars transferred through to the rider's arms requires the rider's entire body to produce a significant amount of energy, which is needed to overcome the external forces.

Still another object of the invention is that a standard triple lock clamp may be replaced with the inventive triple clamp without modification of any kind to the motorcycle or bicycle. Since the basic approach for fastening the triple clamp is unchanged and the shock absorbing forks are normally attached in a similar manner, it is easy to change the standard clamp with the inventive clamp.

Still another object of the invention is that the structure of the inventive triple clamp's shock and vibration damper is stronger than a standard stock triple clamp. The design utilizes aircraft grade aluminum in the preferred embodiment, which is well known for its strength and durability, and the structure is robust with ample thickness in stress points and has built-in safety features in all of the areas where structural integrity is required.

Yet another object of the invention is the inherent design, such that in the event of a crash the handlebars yield slightly, as they are not rigidly attached to the triple clamp and ultimately to the frame. This feature is important in that bent handlebars must be replaced or straightened which is costly, and if handlebars are bent repeatedly in the same location they are subject to breakage since the material tends to yield at a weakened point.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figures 1, 2:
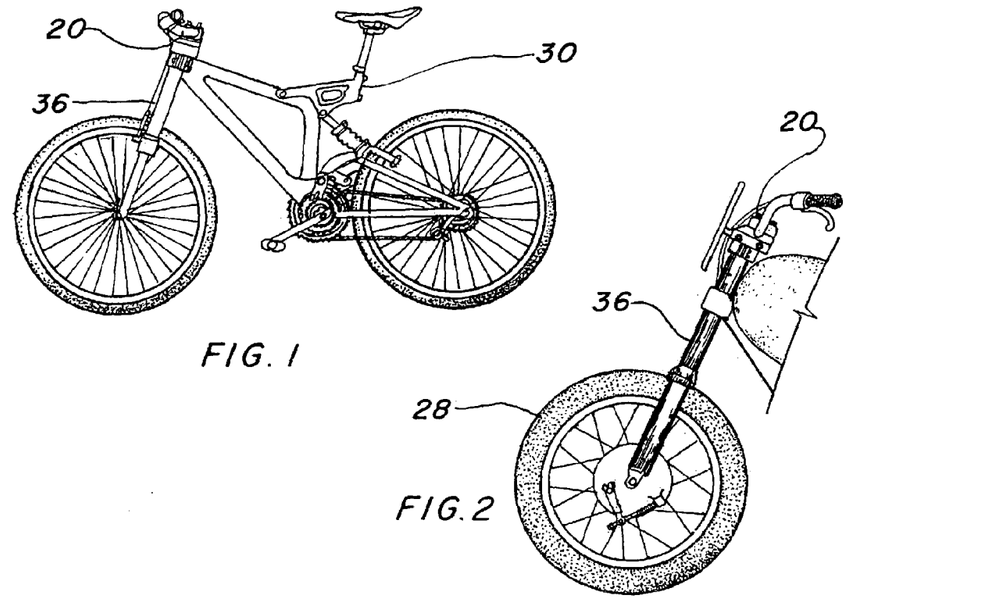
FIG. 1 is a side elevation view of a typical mountain bicycle having the preferred embodiment of the invention attached.
FIG. 2 is a partial side elevation view of a typical motorcycle having the preferred embodiment of the invention attached.
Figure 3:
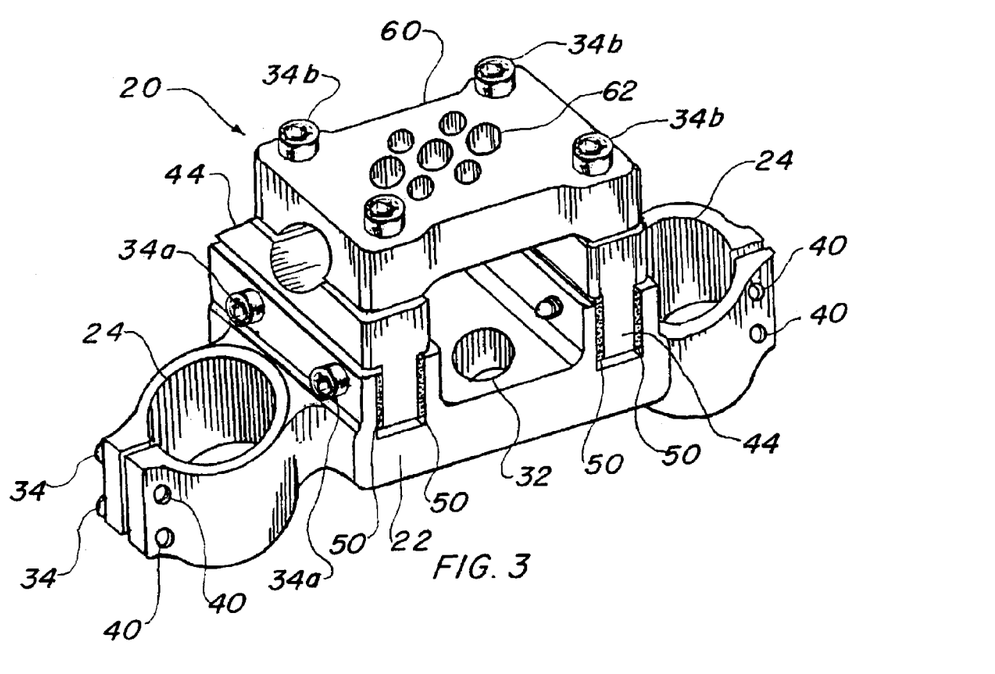
FIG. 3 is a partial isometric view of the preferred embodiment.
Figure 4:
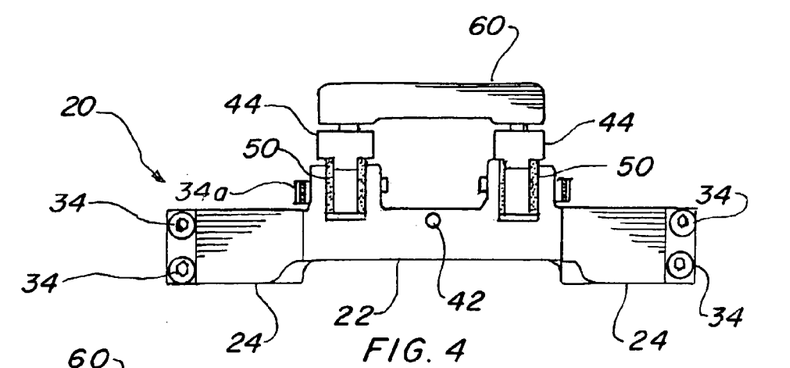
FIG. 4 is a front elevation view of the preferred embodiment.
Figure 5:
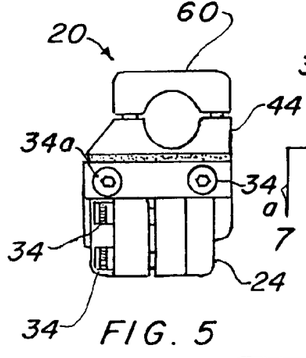
FIG. 5 is a left side elevation view of the preferred embodiment
Figure 6:
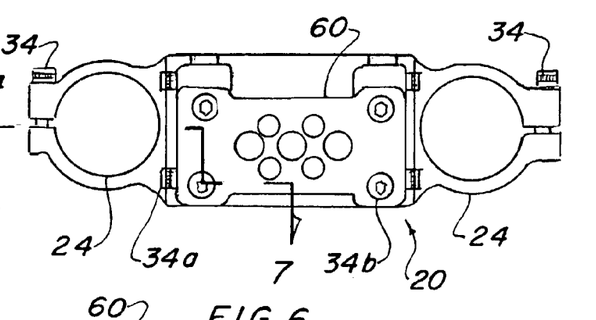
FIG. 6 is a top plan elevation view of the preferred embodiment.

The best mode for carrying out the invention is presented in terms of a preferred embodiment for a shock and vibration reducing triple clamp which may be used on a motorcycle or a bicycle. The preferred embodiment of the shock and vibration reducing triple clamp 20, as shown in FIGS. 1 through 29, is comprised of a handlebar triple clamp body 22 that includes a pair of integral front fork mounting rings 24 positioned on opposed distal ends of the body 22. The body 22 also has a pair of integral upright cradles 26, with each located adjacent to one of the fork mounting rings 24. FIGS. 3–8 illustrate the shock and vibration reducing triple clamp 20 in its assembled condition including all of the hardware necessary to attach a handlebar and shock absorbing forks to a motorcycle 28 or bicycle 30. FIGS. 1 and 2 illustrate the invention mounted on each respective vehicle 28 and 30, as no other modification or accessories are necessary.

In order to install the invention to a motorcycle or bicycle, the handlebar triple clamp body 22 has a steering head pivot bore 32 therethrough which is equally spaced between the front fork mounting rings 24 and toward the rear of the body 22. The method of attachment through a bore or hole is basically standard in the industry and utilizes the same types of compression devices to retain a conventional triple clamp. The preferred size of the bore 32 that is selected for the invention is nominally 1.00 inch (2.54 cm) inner diameter, which is recognized throughout the industry.

Figure 12:
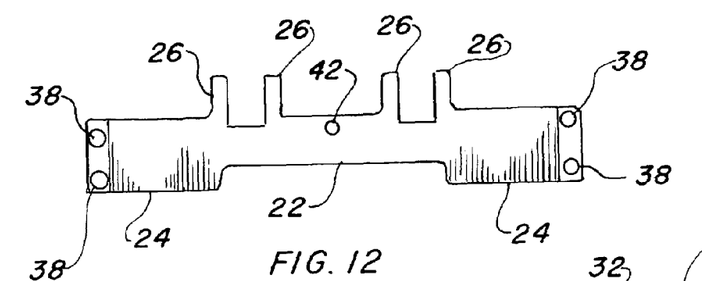
FIG. 12 is a rear view of the handlebar body of the preferred embodiment completely removed from the invention for clarity.
Figure 13:
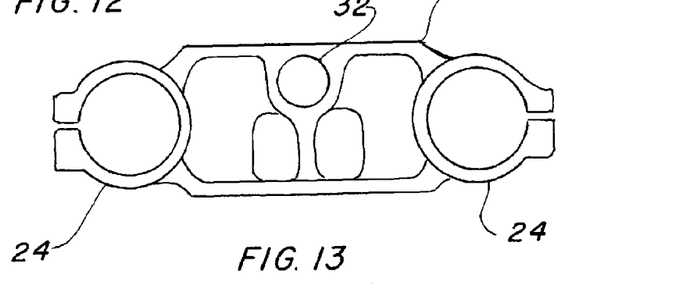
FIG. 13 is a bottom view of the handlebar body of the preferred embodiment completely removed from the invention for clarity.
Figure 14:
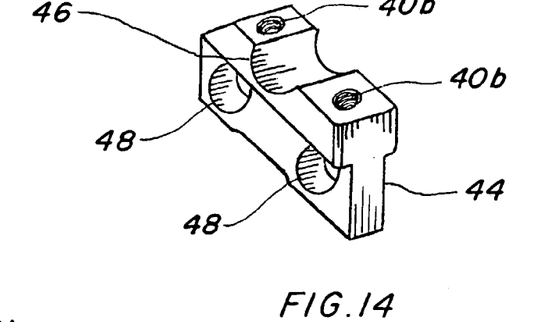
FIG. 14 is a partial isometric view of the lower handlebar clamp completely removed from the invention for clarity.
Figure 15:
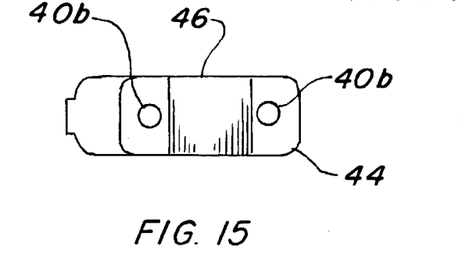
FIG. 15 is a top view of the lower handlebar clamp of the preferred embodiment completely removed from the invention for clarity.
Figure 16:
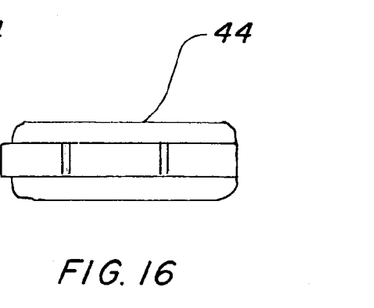
FIG. 16 is a bottom view of the lower handlebar clamp of the preferred embodiment completely removed from the invention for clarity.

A plurality of front fork, mounting ring, compression screws 34, which preferably comprise two on each side, are utilized for tightening the motorcycle or bicycle front fork in the form of shock absorbers 36. FIGS. 3–8 and 22 illustrate the screws 34, and it should be noted that clearance holes 38 and tapped holes 40 are used to complete the attachment and compression of the screws 34. For convenience, the body 22 also has an identification number plate threaded hole 42 within the front horizontal portion, as shown in FIG. 12. An identification number plate is employed in many types of cycle racing and is simply attached with a single screw of the installers choice.

Figure 7:
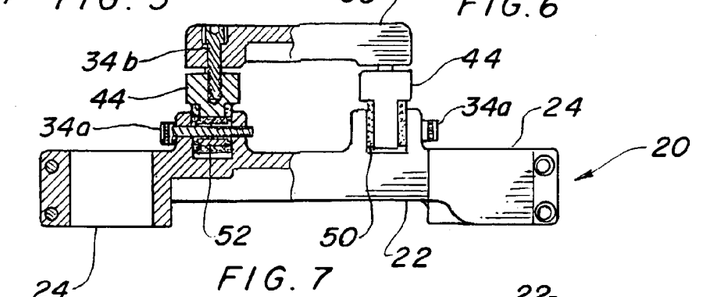
FIG. 7 is a rear view of the preferred embodiment on one half, and a cross sectional view taken along lines 7—7 of FIG. 6 on the other half.
Figure 8:
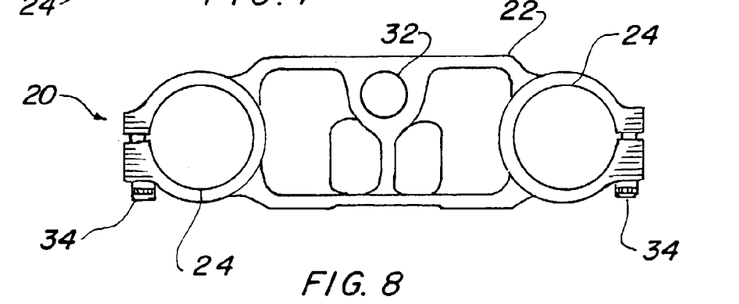
FIG. 8 is a bottom view of the preferred embodiment.
Figure 9:
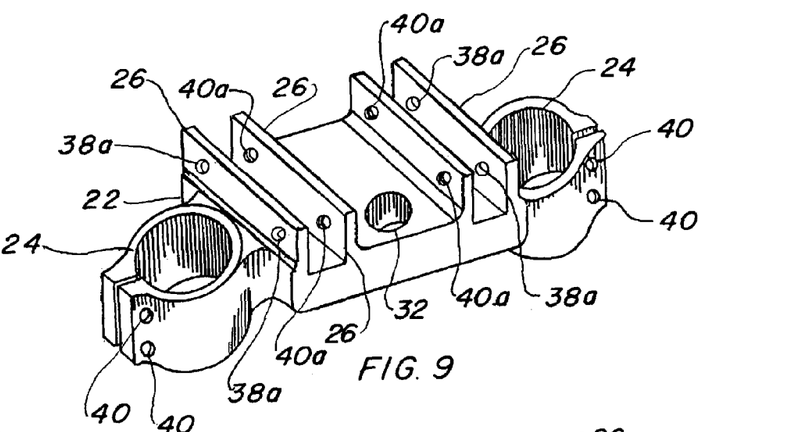
FIG. 9 is a partial isometric view of the handlebar body completely removed from the invention for clarity.
Figure 10:
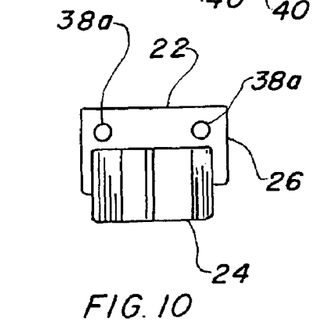
FIG. 10 is a left side elevation view of the handlebar body of the preferred embodiment completely removed from the invention for clarity.
Figure 11:
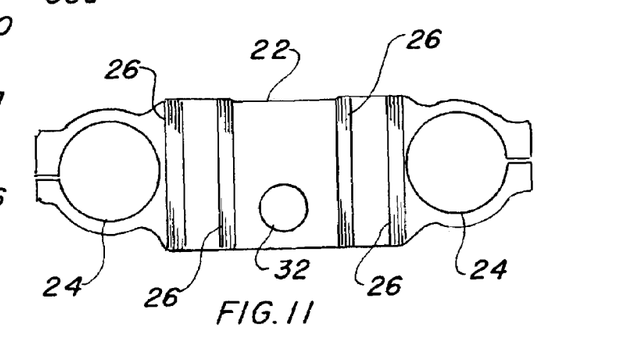
FIG. 11 is a top plan view of the handlebar body of the preferred embodiment completely removed from the invention for clarity.

The integral upright cradles 26 each consists of a pair of parallel upstanding jaws, an outer and an inner, that are equally spaced apart for the entire depth of the body 22, as depicted best in FIGS. 3, 4, 7, 9, 11 and 12. Each outer jaw includes a pair of clearance holes 38a and each inner jaw has mating tapped holes 40a. While the integral upright cradles 26 are each adjacent to fork mounting rings 24, they do not come in contact as they are on a different level, as shown in FIGS. 7 and 12.

The handlebar triple clamp body 22 is formed from a material such as aluminum bar stock, cast aluminum, forged aluminum, investment cast aluminum, titanium, carbon fiber or injection molded polymer and the like. The body 22 consists of a single piece that is machined to the exact shape and tolerance from metal, or if molded from polymer, inserts are utilized for the tapped holes 40.

Figures 17, 18, 19, 20, 21, 22:
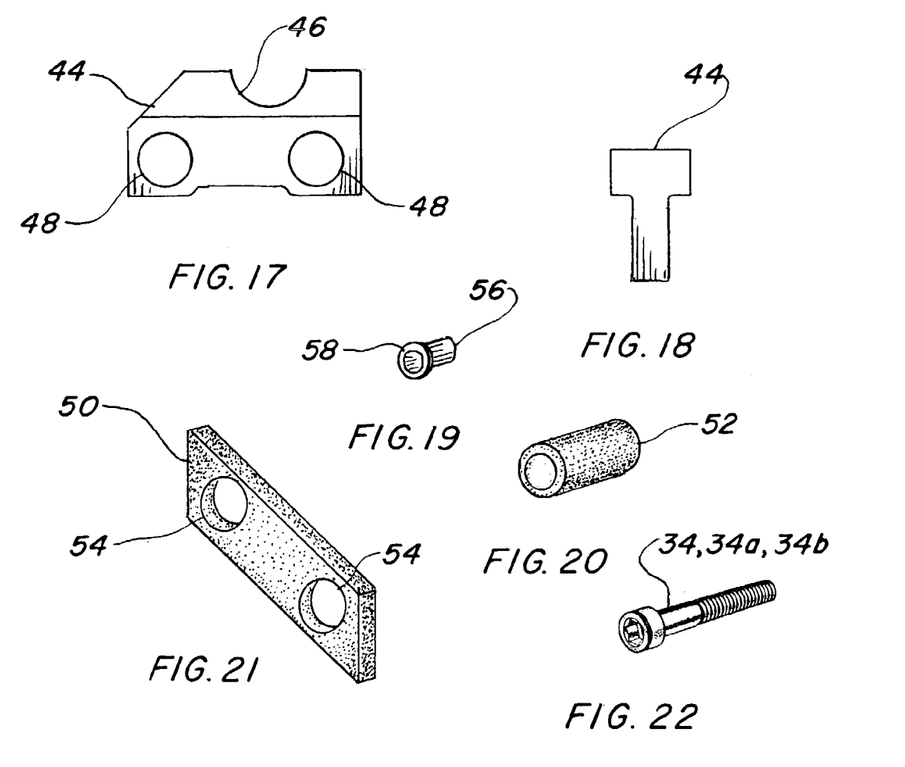
FIG. 17 is a side view of the lower handlebar clamp of the preferred embodiment completely removed from the invention for clarity.
FIG. 18 is a right end view of the handlebar body of the preferred embodiment completely removed from the invention for clarity.
FIG. 19 is a partial isometric view of one of the metallic spacer sleeves of the preferred embodiment completely removed from the invention for clarity.
FIG. 20 is a partial isometric view of one of the resilient hollow cylinders of the preferred embodiment completely removed from the invention for clarity.
FIG. 21 is a partial isometric view of one of the resilient isolation strips of the preferred embodiment completely removed from the invention for clarity.
FIG. 22 is a partial isometric view of one of the screws used in assembly and attachment of the preferred embodiment completely removed from the invention for clarity.
Figure 23:
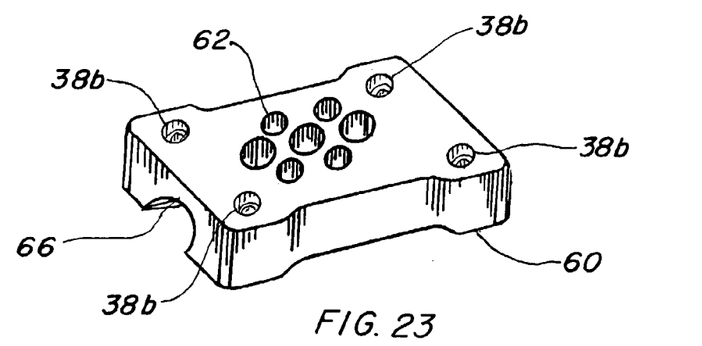
FIG. 23 is a partial isomeric view of the upper handlebar bridge clamp of the preferred embodiment completely removed from the invention for clarity.
Figure 24:
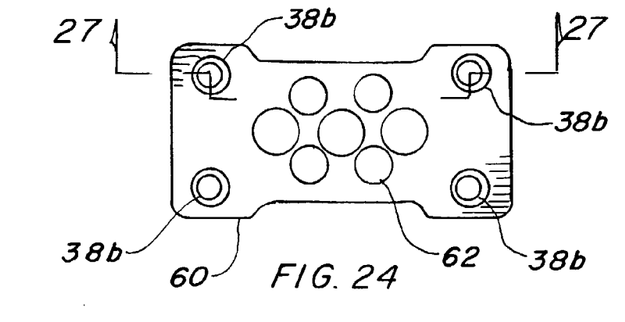
FIG. 24 is a top plan view of the upper handlebar bridge clamp of the preferred embodiment completely removed from the invention for clarity.
Figure 25:
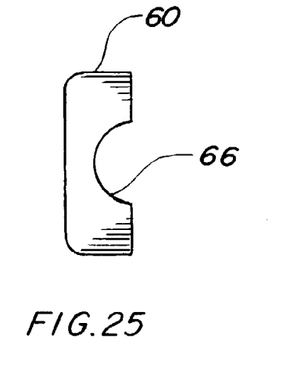
FIG. 25 is a right side view of the upper handlebar bridge clamp of the preferred embodiment completely removed from the invention for clarity.
Figure 26:
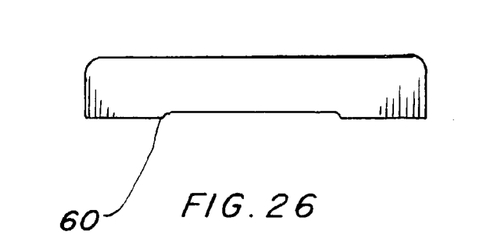
FIG. 26 is a rear elevation view of the upper handlebar bridge clamp of the preferred embodiment completely removed from the invention for clarity.
Figure 27:
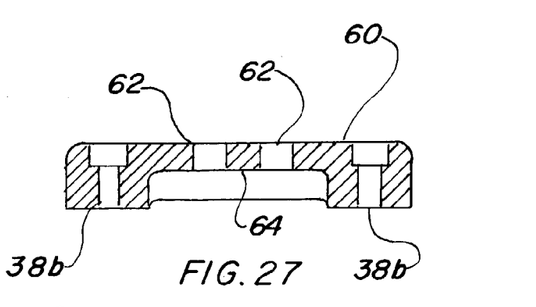
FIG. 27 a cross sectional view taken along lines 27—27 of FIG. 24.
Figure 28:
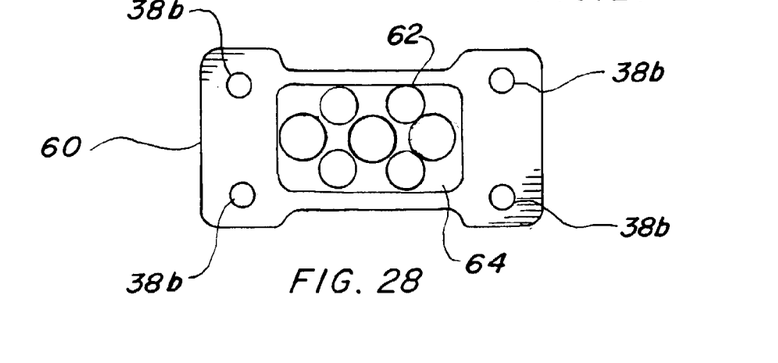
FIG. 28 is a bottom view of the upper handlebar bridge clamp of the preferred embodiment completely removed from the invention for clarity.

A lower handlebar clamp 44 is positioned within each cradle 26, however the clamp 44 is completely set apart from the triple clamp body 22. The lower handlebar clamp 44 is illustrated by itself in FIGS. 14–18, and is in the shape of an elongated tee, with the widest portion on the top and a tee-shaped slope on the front as best shown in FIG. 17. The clamp 44 has a plurality of bridge mounting tapped holes 40b on its upper surface for attaching a bridge, and a semi-circular handlebar mounting cavity 46 is also located on the same upper surface, preferably between two tapped holes 40b. The clamp 44 includes a plurality of clearance apertures 48, which preferably comprise two, on the vertical sides of the smaller portion of the clamp 44 for resilient attachment between the clamp 44 and the cradle 26. The clearance apertures 48 are shown best in the side views of FIGS. 14 and 17 as they penetrate completely through the clamp 44 in a horizontal direction. The lower handlebar clamp 44 is formed from a structural material including aluminum bar stock, cast aluminum, forged aluminum, investment cast aluminum, titanium, carbon fiber or injection molded polymer, which is the same material as the body 22.

The novelty of the invention is focused around the interface of the lower handlebar clamp 44 to the cradles 26. The interface is accomplished using resilient shock and vibration isolation means in the form of a plurality of resilient isolation strips 50. The isolation strips 50 are disposed between the vertical inner surfaces of the upright cradles 26 and the lower handlebar clamps 44, as shown in the cross section of FIG. 7, and the end view of FIGS. 3, 4, and 5. A resilient hollow cylinder 52, which is disposed within in each lower handlebar clamp clearance aperture 48, contiguously engages the isolation strips 50 which also include a set of mating holes 54 that receive the ends of the cylinders 52. Hollow metallic spacer sleeves 56 are disposed within each end of the hollow spacer sleeves 56 within the cylinders 52 such that the spacer sleeves 56 engage each interior side of the clamp body cradle 26 while permitting complete structural isolation between the cradle 26 and the lower handlebar clamp 44. This arrangement of the strips 50 and cylinders 52 with the spacer sleeves 56 provides the preloading and accomplish the shock and vibration isolation of the handlebars from the triple clamp 20.

Figure 29:
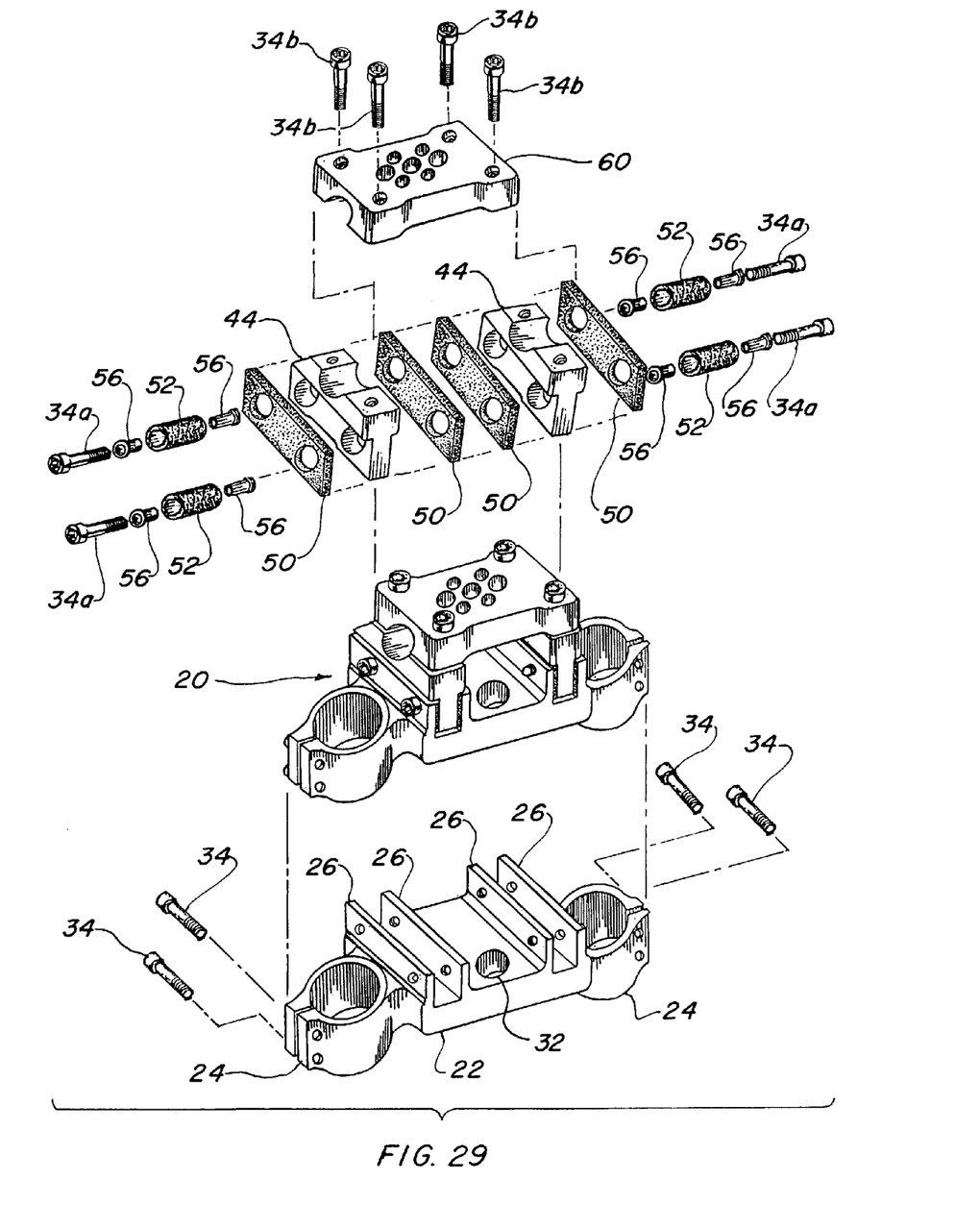
FIG. 29 is an exploded view of the cycle handlebar shock and vibration damper in its preferred embodiment.

In order to preclude the ends of the spacer sleeves 56 from digging into and upsetting the parent material of the cradle 26, the metallic spacer sleeves 56 include a flanged head 58 on one end for engaging each inner surface of the cradle 26. One head 58 is then positioned on each end since the sleeves 56 are used in concert, as shown in FIGS. 7 and 29.

To complete the resilient shock and vibration isolation means, a lower handlebar clamp mounting screw 34a is inserted into each clearance hole 38a that is located in the outer upright of the cradle 26, through the pair of spacer sleeves 56 and into the tapped hole 40a in the opposite inside upright of the cradle 26. The spacer sleeves 56 preload both the cylinders 52 and isolation strips 50 when the screws 34a are tightened. This arrangement of utilizing the lower handlebar clamp mounting screw 34a to attach the clamp 44 to the cradle 26 through the hollow metallic spacer sleeves 56 permits complete structural isolation between the cradle and the lower handlebar clamp.

In the preferred embodiment, the isolation strips 50 and hollow cylinders 52 are formed of urethane having a resilience of from 40 to 100 shore, with 70 shore being found to be ideal in functional testing. As an option the isolation strips 50 and hollow cylinders 52 may also be formed of synthetic rubber. It is also possible to vulcanize the isolation strips 50 onto the upright cradles 26 at an inner portion of the upright, and to vulcanize the hollow cylinders 52 onto the metallic spacer sleeves 56 using any appropriate form of resilient thermoplastic or thermoset material, as well as rubber in any of its forms.

An upper handlebar bridge clamp 60 is attachably disposed above each lower handlebar clamp 44 such that a handlebar may be inserted and compressably retained therebetween, thereby decreasing vibration and shock impulses upon the handlebar during operation of the cycle. A plurality of handlebar bridge mounting clearance holes 38b are provided for attaching the bridge clamp 60 to the lower handlebar clamp 44 with handlebar bridge clamp screws 34b, as illustrated in the exploded view of FIG. 29. The clearance holes 38b may also be countersunk to permit the head of the screw 34b to be flush with the upper surface of the bridge clamp 60.

The upper handlebar bridge clamp 60 may further include a number of lightening holes 62 and a recess 64 on the underside to reduce the weight of the clamp 20. The bridge clamp 60 also contains a mating mounting handlebar cavity 66 which is identical to the semi-circular handlebar mounting cavity 46 in the lower handlebar clamp 44 except in reverse. The bridge clamp 60 is formed from a material consisting of aluminum bar stock, cast aluminum, forged aluminum, investment cast aluminum, titanium, carbon fiber or injection molded polymer.

To install the assembled handlebar shock and vibration damper triple clamp 20, the body 22 is placed over the bicycle or motorcycle steering head pivot bore 32, as previously described and tightened in place conventionally. The shock absorbers 36 or round ended forks of the motorcycle or bicycle are slipped into each fork mounting ring 24 and tightened with the screws 34. The cycle handlebars are placed between the handlebar mounting cavities 46 and 66 and tightened with the screws 34b. If an identification number plate is required, it may be attached with a screw to the identification number plate threaded hole 42 located in the front of the body 22.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

What is claimed is:

1. A handlebar shock and vibration damper triple clamp for a motorcycle or a bicycle comprising:
   a) a handlebar triple clamp body having a pair of integral front fork mounting rings positioned on opposed distal ends of the body, and a pair of integral upright cradles, with each cradle located adjacent to one of the fork mounting rings,
   b) resilient shock and vibration isolation means contiguously engaging each of the clamp body cradles on a vertical inner surface thereof, wherein said resilient shock and vibration isolation means further comprising a plurality of resilient isolation strips disposed between the integral upright cradles and the lower handlebar clamps, wherein each lower handlebar clamp having a plurality of clearance apertures therethrough with a plurality of resilient hollow cylinders disposed within the clearance apertures contiguously engaging the isolation strips, said cylinders also having a plurality of hollow metallic spacer sleeves disposed within the hollow of the cylinders such that the spacer sleeves engage each inner side of the clamp body cradle while permitting complete structural isolation between the cradle and the lower handlebar clamp which is held by the resilience of the shock and vibration isolation means,
   c) a lower handlebar clamp intimately contacting each resilient shock and vibration isolation means positioned within each cradle, and
   d) an upper handlebar bridge clamp attachable disposed above each lower handlebar clamp such that a handlebar may be inserted and compressably retained therebetween, thus decreasing vibration and shock impulses upon the handlebar during operation of the cycle.

2. The handlebar shock and vibration damper triple clamp as recited in claim 1 wherein said metallic spacer sleeves further comprising a flanged head on one end for engaging each inner surface of the clamp body cradle wherein the sleeves are used in concert.

3. The handlebar shock and vibration damper triple clamp as recited in claim 1 further comprises a plurality of lower handlebar clamp mounting screws with said cradle having a pair of lower handlebar clamp mounting screw clearance holes on an outer upright of the cradle, and a pair of lower handlebar clamp mounting threaded holes on an inner upright in parallel disposition such that each lower handlebar clamp mounting screw attaches the clamp to the cradle through the hollow metallic spacer sleeves while permitting complete structural isolation between the cradle and the lower handlebar clamp.

4. The handlebar shock and vibration damper triple clamp as recited in claim 1 wherein said isolation strips and hollow cylinders are formed of urethane.

5. The handlebar shock and vibration damper triple clamp as recited in claim 4 wherein said urethane forming the isolation strips and hollow cylinders have a resilience of from 40 to 100 shore.

6. The handlebar shock and vibration damper triple clamp as recited in claim 1 wherein said isolation strips and hollow cylinders are formed of synthetic rubber.

7. The handlebar shock and vibration damper triple clamp as recited in claim 1 wherein said isolation strips are vulcanized onto the upright cradles at an inner portion of the upright, and the hollow cylinders are vulcanized to the metallic spacers sleeves.

8. A handlebar shock and vibration damper triple clamp for a motorcycle or a bicycle comprising:
   a) a handlebar triple clamp body having a pair of integral front fork mounting rings positioned on opposed distal ends of the body, and a pair of integral upright cradles, with each cradle located adjacent to one of the fork mounting rings,
   b) resilient shock and vibration isolation means contiguously engaging each of the clamp body cradles on a vertical inner surface thereof,
   c) a lower handlebar clamp intimately contacting each resilient shock and vibration isolation means positioned within each cradle, wherein said lower handlebar clamp further comprises a tee-shaped slope on the clamp's front surface, and said lower handlebar clamp having a plurality of bridge mounting tapped holes on top for attaching said upper handlebar bridge, wherein said lower handlebar clamp having a semi-circular handlebar mounting cavity therein, and
   d) an upper handlebar bride clamp attachably disposed above each lower handlebar clamp such that a handlebar may be inserted and compressably retained therebetween, thus decreasing vibration and shock impulses upon the handlebar during operation of the cycle.

9. The handlebar shock and vibration damper triple clamp as recited in claim 8 wherein said lower handlebar clamp further having a plurality of clearance apertures for receiving said resilient shock and vibration isolation means.

10. The handlebar shock and vibration damper triple clamp as recited in claim 8 wherein said lower handlebar clamp is formed from a material selected from the group consisting of aluminum bar stock, cast aluminum, forged aluminum, investment cast aluminum, titanium, carbon fiber and injection molded polymer.

11. The handlebar shock and vibration damper triple clamp as recited in claim 8 wherein said upper handlebar bridge clamp further having a plurality of handlebar bridge mounting clearance holes which allow attachment of the bridge clamp to the lower handlebar clamp.

12. The handlebar shock and vibration damper triple clamp as recited in claim 11 further comprising a plurality of handlebar bridge clamp screws for mounting the bridge clamp to the lower handlebar clamp through the bridge mounting clearance holes.

13. The handlebar shock and vibration damper triple clamp as recited in claim 8 wherein said upper handlebar bridge clamp further having a plurality of lightening holes, and said bridge clamp is formed from a material selected from the group consisting of aluminum bar stock, cast aluminum, forged aluminum, investment cast aluminum, titanium, carbon fiber and injection molded polymer.

* * * * *